March 20, 1962  G. A. LYON  3,025,819
METHOD OF MAKING WHEEL TRIM
Filed Jan. 12, 1960  2 Sheets-Sheet 1
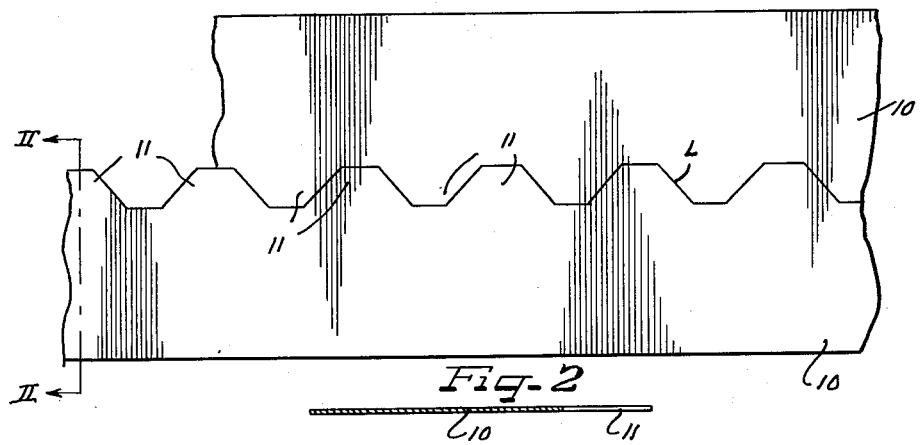
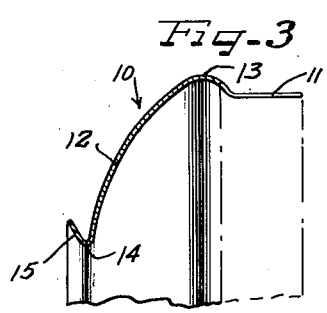
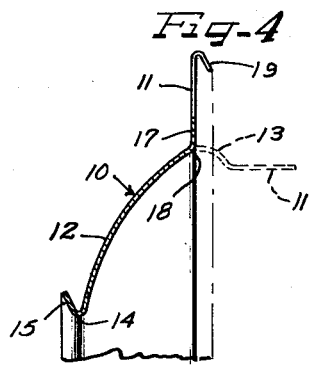
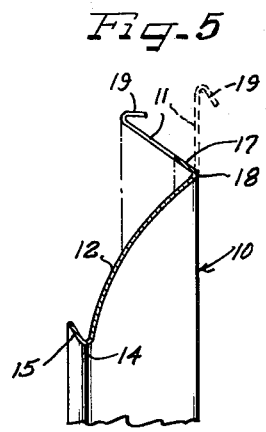
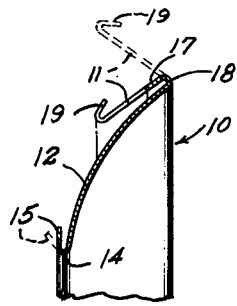
INVENTOR
*George Albert Lyon*
ATTORNEY March 20, 1962 G. A. LYON 3,025,819
METHOD OF MAKING WHEEL TRIM
Filed Jan. 12, 1960 2 Sheets-Sheet 2
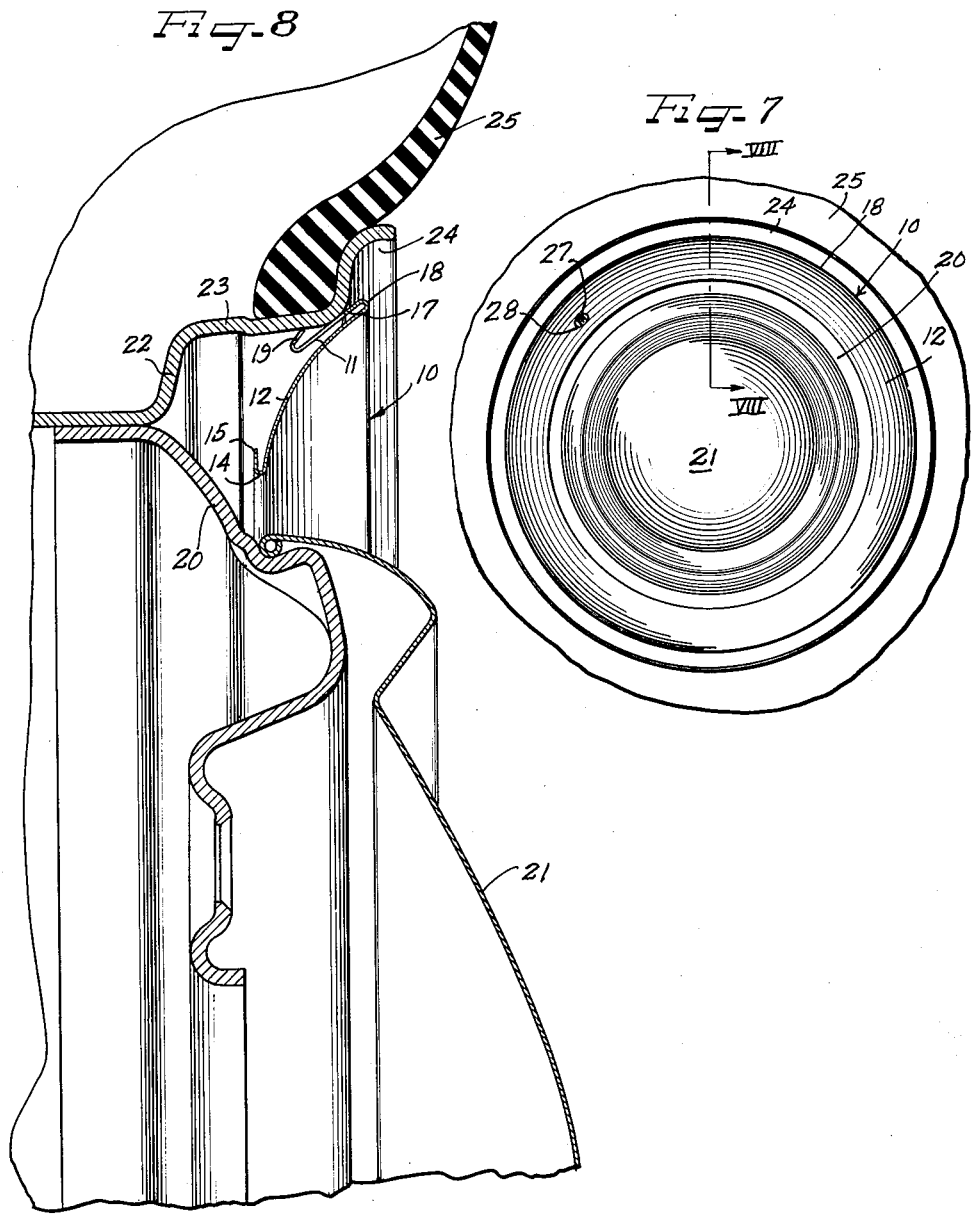
INVENTOR
George Albert Lyon
BY
ATTORNEYS

United States Patent Office 3,025,819
Patented Mar. 20, 1962

3,025,819
METHOD OF MAKING WHEEL TRIM
George Albert Lyon, Detroit, Mich., assignor to Lyon Incorporated, Detroit, Mich., a corporation of Delaware
Filed Jan. 12, 1960, Ser. No. 2,052
5 Claims. (Cl. 113—116)

The present invention relates to improvements in making wheel trim adapted to be attached in press-on, pry-off relation over the outer side of a vehicle wheel such as an automobile wheel.

Wheel trim rings of the kind that are employed for protective and decorative disposition over especially the tire rim and the adjacent portion of a wheel body supporting a tire rim can, of course, be made by die stamping and shaping the same from wide strips of sheet metal stock, involving the punching out of a central scrap blank of substantial diameter for which it is often difficult to find a profitable use. It is therefore highly desirable to produce trim rings by shaping the same from narrow strip stock with little or no waste from scrap. With certain shapes of such trim rings, however, difficulties are encountered in converting the straight strip stock into a ring shaped member having desirable transverse contours and retaining flange structure therebehind.

It is accordingly an important object of the present invention to provide an improved method of making wheel trim members from narrow sheet metal strips.

Another object of the invention is to provide an improved method of making sheet metal trim rings by rolling sheet metal strip stock into the circular form the rings are to take.

A further object of the invention is to provide an improved method of making vehicle wheel trim rings economically and without waste of material by rolling the same from sheet metal strip stock to a preliminary contour and then completing formation of the trim rings in steps adapted to be performed in die press equipment.

Still another object of the invention is to provide an improved method of making trim rings for vehicle wheels, according to which method strip sheet metal stock is rolled to provide an annular body portion in substantially the finished contour thereof and with trim retaining finger flange structure projecting in an axially outward direction relative to the body flange and from which disposition the retaining finger structure is displaced by progressive steps to extend in generally the opposite axial direction behind the body flange and thereby attaining a work hardening of the outer marginal portion of the trim ring.

Other objects, features and advantages of the present invention will be readily apparent from the following detailed description of a preferred embodiment thereof taken in conjunction with the accompanying drawings, in which:

FIGURE 1 is a fragmentary plan view of a sheet metal strip from which trim rings according to the present invention are adapted to be made;

FIGURE 2 is a transverse sectional detail view through a trim ring section of the strip stock of FIGURE 1, taken substantially on the line II—II but enlarged to about double the scale of FIGURE 1;

FIGURE 3 is a sectional view similar to FIGURE 2 but showing the strip after it has been subjected to a rolling operation to provide a predetermined cross-sectional shape in ring form;

FIGURE 4 is a similar sectional view but showing the ring member after a further operation thereon which may be effected in suitable die apparatus;

FIGURE 5 is a sectional view similar to FIGURE 4 but showing a further forming step which may be effected in die apparatus;

FIGURE 6 is a further similar sectional view showing the final shaping steps;

FIGURE 7 is an outer side elevational view of a vehicle wheel structure showing the finished trim ring in place thereon; and FIGURE 8 is an enlarged radial sectional detail view taken substantially on the line VIII—VIII of FIGURE 7.

In the production of an economical wheel trim ring, sheet metal strip stock of thin gauge such as stainless steel, brass, aluminum alloy, or the like is provided in a width equal to the stock needed to provide two trim rings in each unit length of the original strip. This strip is, as shown in FIGURE 1, longitudinally centrally severed along a uniformly angularly jagged line L to provide two equal blank strips 10 having equal finger extensions 11 along the severance line L while the remaining edges of the strips may, as shown, remain straight at the outside edges of the original blank.

In the next operation, each of the strip sections 10 is rolled from the flat condition, shown in FIGURES 1 and 2, into the transversely contoured shape shown in FIGURE 3 and at the same time is shaped into substantially the circular diameter of the ultimate trim ring. In this circular diameter, the free ends of the strip section 10 are secured permanently together, desirably by butt welding the end edges, thereby to produce an endless annulus in which a body flange 12 comprises the major portion of the width of the ring and is in substantially its final shape except for possibly some slight sizing that may occur at a later stage in formation of the ring. In this form, the body flange 12 extends generally radially and axially inwardly with respect to the outer face of the ring, that is the side of the ring which faces generally axially outwardly of the wheel when the ring is applied thereto.

In the rolling operation, it is necessary in order to hold the strip being rolled against side slip to provide a plurality of grooves longitudinally in the strip so that complementary shaping contours of the rolls will interlock with the material defining the strip grooves and thus maintain not only a strip shaping but also an anti-creeping or side slip coaction of the forming rolls. Accordingly, as the strip 10 is rolled, there is formed at juncture of the finger extensions 11 with the body 12 a generally radially outwardly projecting rib 13 providing, of course, a corresponding radially inwardly opening groove, with the finger extensions 11 extending straight axially outwardly and angularly relative to the axially outer side portion of the rib 13. At the same time, the opposite originally straight edge margin of the strip is bent to provide a generally radially inwardly projecting rib 14 defined on its axially outer side by the contiguous portion of the body flange 12 and at its axially inner side by an underturned axially inwardly and radially outwardly projecting marginal flange 15 and providing a radially outwardly opening groove. Thus, the respective oppositely radially opening grooves defined by the respective ribs 13 and 14 which are located at the respective opposite margins of the body flange 12 serve as anti-creep interlocks for complementary shaping roll portions.

Since the ribs 13 and 14 afford grooves that are open and clear of obstructions and are shallow, frictional resistances in the opposing shaping rolls are minimized and the strip can be produced at high speed with minimum power expenditure in the operation of the rolls.

After each of the strips 10 has been rolled into shape, the free ends of the strip are secured permanently together as by butt welding the same and the annulus is ready to be further operated upon in suitable drawing press apparatus to complete forming of the trim ring so that it can be applied to the outer side of a vehicle wheel. To this end, as shown in FIGURE 4, material comprising the axially outer side of the outer marginal rib 13 is turned with the finger extensions 11 about a bend line located adjacent to the deepest part of the groove defined by the rib 13 to extend radially outwardly and provide an annular narrow flange 17 having an angular juncture 18 on said bend line with the ring body portion 12. At this time, also, juncture of the finger extensions 11 with the flange portion 17 is preferably straightened out so that the finger extensions project radially outwardly in the plane of the flange 17. In this operation, or immediately thereafter, the terminal end portions of the finger extensions 11 are turned to project obliquely into opposing relation to the body portions of the finger extensions at the axially outer sides thereof to provide retaining terminal flanges 19.

Thereafter, by progressive steps as shown in FIGURES 5 and 6, the angular marginal flange 17 is turned axially inwardly and then radially inwardly behind the adjoining margin of the body portion 12 of the ring member, thereby swinging the retaining finger extensions 11 correspondingly into position behind the ring member body and with the retaining terminals 19 projecting radially and axially outwardly as shown in full line in FIGURE 6. At completion of the underturning of the flange 17 and the finger extensions 11, the juncture bend 18 provides a generally radially outwardly projecting reinforcing and finishing radially outer terminal edge for the ring member, while a complementary terminal edge is provided by the juncture rib 14 at the inner extremity of the ring, the inner terminal flange 15 being bent toward the back of the ring body 12 if desired as shown, from the dash outline to the full outline position in FIGURE 6. It will be appreciated, of course, that the working to which the outer marginal flange 17 and the inner marginal flange 15 is subjected in each instance work hardens such flanges and affords resilient stiffness against damaging deformation of the margins of the ring member 10.

As shown in FIGURES 7 and 8, the finished ring member 10 is adapted to be applied in press-on, pry-off relation over the outer side of a vehicle wheel including a disk spider wheel body 20 which is adapted to support in centered relation thereon a hub cap 21 and carries peripherally a multi-flange, drop center tire rim 22 having an intermediate radially inwardly facing flange 23 leading into a terminal flange 24 and constructed to support a pneumatic tire 25. The trim ring 10 is adapted to be applied to the wheel by centering the same so that a valve stem 27 carried by the tire rim extends through a valve stem opening 28 in the ring body portion 12 and the ring then pressed axially inwardly to effect retaining gripping engagement of the tips of the retaining finger terminals 19 with the intermediate flange 23. It is understood, of course, that the tips of the terminals 19 will project normally to a slightly larger diameter than the diameter of the axially outer portion of the intermediate flange 23 to be engaged thereby in retaining the ring on the wheel. Removal of the trim ring 10 from the wheel may be effected by inserting a pry-off tool behind the underturned marginal flange 17 and prying the retaining fingers free from their engagement with the rim flange.

It will be understood that modifications and variations may be effected without departing from the scope of the novel concepts of the present invention.

I claim as my invention:

1. In a method of making trim rings for application in covering relation to the outer sides of vehicle wheels, rolling strip sheet metal stock into circular form and in such rolling shaping the major width portion of the strip into a body portion extending generally radially and axially inwardly with respect to the side of the ring which faces axially outwardly when the ring is applied to a wheel, during the rolling shaping opposite marginal portions of the ring into respectively oppositely radially projecting ribs and corresponding oppositely opening grooves within which complementary forming roll portions are engageable to thereby hold the strip against creeping laterally during the rolling, joining the ends of the strip to form the same into a continuous ring, turning that part of the radially outer marginal portion of the ring which is on the opposite side of the groove therein from said body portion into position behind the radially outer margin of the body portion, and forming said part into ring retaining structure engageable with a vehicle wheel to retain the ring in place on the wheel.

2. In a method of making trim rings for application in covering relation to the outer sides of vehicle wheels, rolling strip sheet metal stock into circular form and in such rolling shaping the major width portion of the strip into a body portion extending generally radially and axially inwardly with respect to the side of the ring which faces axially outwardly when the ring is applied to a wheel, during the rolling shaping opposite marginal portions of the ring into respectively oppositely radially projecting ribs and corresponding oppositely opening grooves within which complementary forming roll portions are engageable to thereby hold the strip against creeping laterally during the rolling, joining the ends of the strip to form the same into a continuous ring, turning that part of the radially outer marginal portion of the ring which is on the opposite side of the groove therein from said body portion into position behind the radially outer margin of the body portion, forming said part into ring retaining structure engageable with a vehicle wheel to retain the ring in place on the wheel, and turning the free part of the inner marginal portion of the ring, which forms the inner marginal rib in conjunction with the adjacent part of the ring body portion, toward the axially inner side of the body portion as a reinforcing flange.

3. In a method of making a ring member from a strip of sheet metal having a uniform series of finger extensions along one margin, rolling the strip into substantially circular ring form with said finger extensions on the radially outer periphery of the ring form, in such rolling shaping said one margin contiguous the finger extensions into a radially outwardly projecting rib defining a radially inwardly opening groove within which a forming roll engages, simultaneously shaping the major width of the strip to project radially inwardly from said rib and generally axially inclined away from said finger extensions, turning that part of said rib having the finger extensions thereon about a bend line located adjacent to the deepest part of the groove to extend radially outwardly and provide an annular narrow flange joining the body portion on an angular juncture on said bend line, and continuing turning of said narrow flange into position adjacent to the axially opposite side of the body portion relative to the side which said flange opposed while part of said rib, whereby to position said finger extensions on said opposite side of the body portion.

4. The method of claim 3, further characterized in that said finger extensions are maintained substantially coplanar with said flange as the flange is further turned into position with respect to said opposite side of the body portion.

5. The method of claim 3, further characterized in that during the turning of said flange said finger extensions are formed with angular gripping terminal flanges.

References Cited in the file of this patent

FOREIGN PATENTS 467,114     Canada _____ Aug. 8, 1950